(12) United States Patent
Ricord et al.

(10) Patent No.: US 7,690,375 B2
(45) Date of Patent: Apr. 6, 2010

(54) DEEP FAT TUBE FRYER BURNER ASSEMBLY

(75) Inventors: Charles David Ricord, Shreveport, LA (US); Charles Milton Hutchinson, Shreveport, LA (US)

(73) Assignee: Frymaster LLC, Shreveport, LA (US)

( * ) Notice: Subject to any disclaimer, the term of this patent is extended or adjusted under 35 U.S.C. 154(b) by 168 days.

(21) Appl. No.: 11/515,551

(22) Filed: Sep. 5, 2006

(65) Prior Publication Data

US 2007/0089732 A1    Apr. 26, 2007

Related U.S. Application Data

(60) Provisional application No. 60/729,039, filed on Oct. 21, 2005.

(51) Int. Cl.
*F23C 3/00* (2006.01)
(52) U.S. Cl. ............... 126/91 A; 126/91 R; 126/373.1; 126/374.1
(58) Field of Classification Search ............... 126/91 A, 126/91 R, 373.1, 374.1, 375.1, 376.1, 99 A, 126/99 D; 431/171, 326, 353; 99/330, 403
See application file for complete search history.

(56) References Cited

U.S. PATENT DOCUMENTS

| 2,176,869 | A | * | 10/1939 | Childs | 126/391.1 |
| 4,895,137 | A | | 1/1990 | Jones et al. | |
| 5,253,566 | A | * | 10/1993 | McCabe et al. | 99/403 |
| 5,901,641 | A | * | 5/1999 | McNamara | 99/403 |
| 6,029,653 | A | * | 2/2000 | Tiszai | 99/403 |
| 6,461,149 | B1 | * | 10/2002 | Ahmady | 431/329 |

* cited by examiner

*Primary Examiner*—Alfred Basichas
(74) *Attorney, Agent, or Firm*—Ohlandt, Greeley, Ruggiero & Perle, L.L.P.

(57) ABSTRACT

The gas tube fryer comprises substantially 90° in-shot burners, burner mounting boxes, a one-piece burner mounting bracket, and a bracket housing, all of which are used in conjunction with heat exchanger tubes, heat transfer baffles, a frypot, and a flue in a fryer. The burner mounting boxes are keyed specifically to the face of the burner, preventing substantial movement of the burners and introduction of ambient air into the heat exchange tubes. Each burner is also keyed to the mounting bracket, also preventing substantial movement and providing easy installation and repair. The ninety-degree orientation of the burners facilitates mixing of the combustion gases, and the burner comprises a screen on its face that helps to ensure maximum burner efficiency.

9 Claims, 13 Drawing Sheets

DEEP FAT TUBE FRYER BURNER ASSEMBLY

CROSS-REFERENCE TO RELATED APPLICATION

This application claims priority to U.S. Provisional Application Ser. No. 60/729,039, filed on Oct. 21, 2005.

BACKGROUND OF THE INVENTION

1. Field of the Invention

The present disclosure relates to gas fryers. More particularly, the present disclosure relates to a gas fryer that utilizes burners and heat exchanger tubes to transfer heat to a cooking medium in a frypot.

2. Description of the Related Art

Deep fat tube fryers are well known in the field. These fryers typically include a frypot containing a cooking oil medium and one or more heat exchanger tubes that run through the frypot below the surface of the cooking oil. Burners are typically connected to one end of these heat exchanger tubes and heat the tube so that the heat is transferred to the cooking oil. A flue is usually used on the opposite end of the heat exchanger tube from the burner to discharge the combustion by-products. Often baffles are used inside the heat exchanger tubes to retard the flow of the combustion gasses and thereby increase the rate of heat transfer to the cooking medium. Additionally, the baffles assist in the transfer of heat by conducting heat themselves.

Due to their use in industrial applications such as fast food restaurants, it is desirable to make these fryers as efficient as possible and easy to service, in order to reduce operating costs. Many conventional fryers, however, have burners that are mounted to the heat exchanger tube in a way that allows the escape of some of the combustion gasses. One other difficulty with conventional deep fat tube fryers is that the burners are rigidly mounted to the heat exchanger tubes, or mounted to the heat exchanger tubes with a number of fasteners. Either of these configurations requires a significant amount of time for service and repair.

Additionally, many in-shot burners used with heat exchanger tubes are mounted either co-axially with the heat exchanger tubes of the fryer or at an angle downward to the horizontal. Neither of these configurations is desirable. The co-axial orientation often requires that the burner be shorter than what optimal burning conditions would require, due to space limitations. Those burners that use an angled mounting orientation are not desirable because they force the combustion gas down into the heat exchanger tube, against the forces of gravity and/or buoyancy. This is not an ideal condition to facilitate the mixing of the gas fuel with air.

Typically, burners currently in use employ a cast hole(s) or perforated plate as the burner face leading into the heat exchanger tube. These configurations are undesirable because they decrease the efficiency with which the combustion gasses are mixed and burned.

Consequently, there is a need for a burner assembly that provides an efficient burn and high heat transfer rate for the fryer, which is convenient and easy to service.

It is an object of the present invention to provide a burner assembly for a tube fryer that is easy to service and maintain.

It is a further object of the present invention to provide an increased burning efficiency over the currently available systems.

SUMMARY OF THE INVENTION

A burner assembly of the present invention comprises one or more ninety-degree in-shot burners, one or more burner mounting boxes, a one-piece burner mounting bracket, and a bracket housing, to be used in conjunction with heat exchanger tubes, heat transfer baffles, a frypot and a flue in a fryer.

Burner mounting boxes are mounted at one end of each heat exchanger tube. The heat exchanger tubes extend through the length of the frypot, below the oil level. The burner mounting boxes are keyed specifically to a burner face, preventing substantial introduction of ambient air into the heat exchanger tubes and thereby increasing burner efficiency. Each burner is also keyed to the one-piece mounting bracket to ensure that the burners are placed in their proper orientation, and to prevent substantial movement of the burner when the fryer is in use or transit.

The gas is introduced to the burner assembly through a manifold located at the lower end of the burners. It travels up the vertical part of the burner and exits at the top, where the ninety-degree burner face meets the burner mounting box. The gas is ignited at the burner face by a pilot source. The screen covering the burner face is designed to provide a maximum burner efficiency and ease of control by the user.

Flames and combustion gasses then longitudinally traverse each heat exchanger tube, transferring heat to the tube and heat transfer baffle, heating the surrounding fryer oil bath, and subsequently exhausting out through the frypot flue.

The above described and other features and advantages of the present disclosure will be appreciated and understood by those skilled in the art from the following detailed description and drawings.

DESCRIPTION OF THE PREFERRED EMBODIMENT

Figure 1:
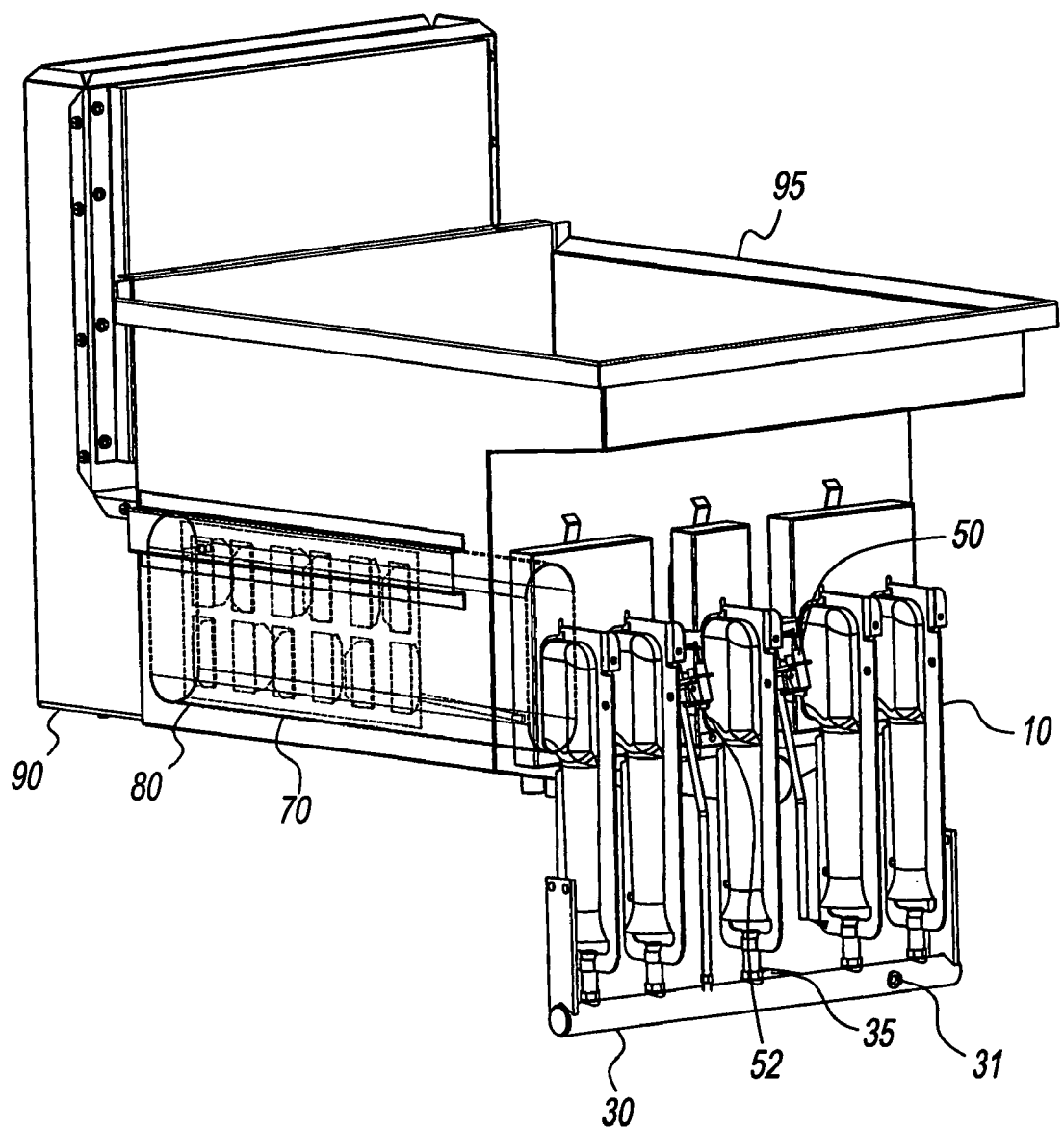
FIG. 1 shows a rear, left side perspective view of a five-burner assembly, including burners, mounting boxes, and a gas manifold connected to a frypot.
Figure 2:
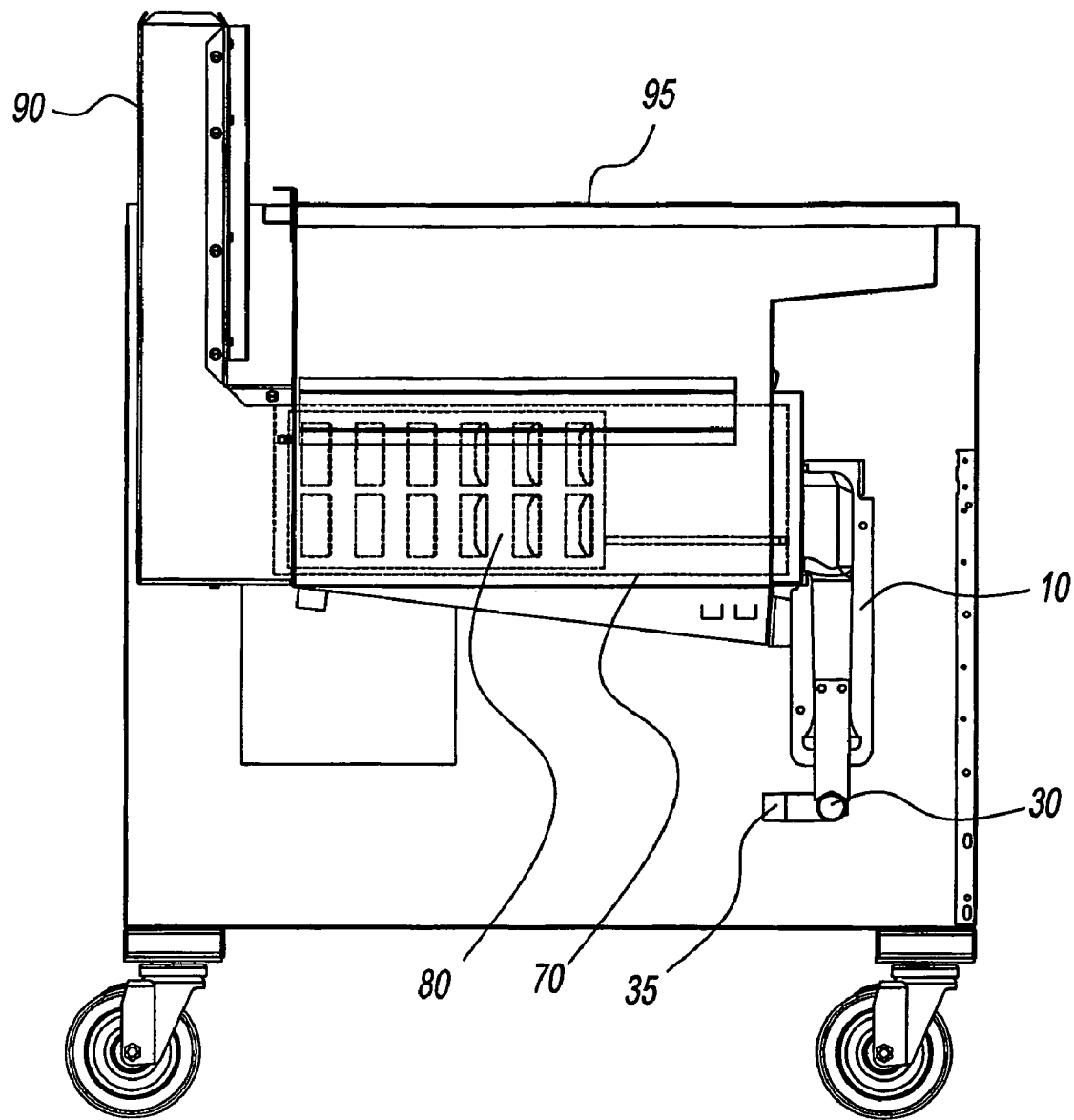
FIG. 2 shows a side view of the assembly shown in FIG. 1.

Referring to FIGS. 1 and 2, an assembly of five burners 10, gas manifold 30, heat exchanger tube 70, heat transfer baffle 80, flue 90, and frypot 95 are shown. Gas manifold 30 can have manifold testing port 31, which during maintenance can be used to ensure that a proper amount of gas is flowing through the manifold at an adequate pressure. Manifold testing port 31 remains sealed during fryer operation. Gas manifold 30 also has gas inlet 35. When the burner assembly is in use, combustion gas is introduced into gas manifold 30 through gas inlet 35 and travels up through burners 10, as is discussed in further detail below.

Figure 3:
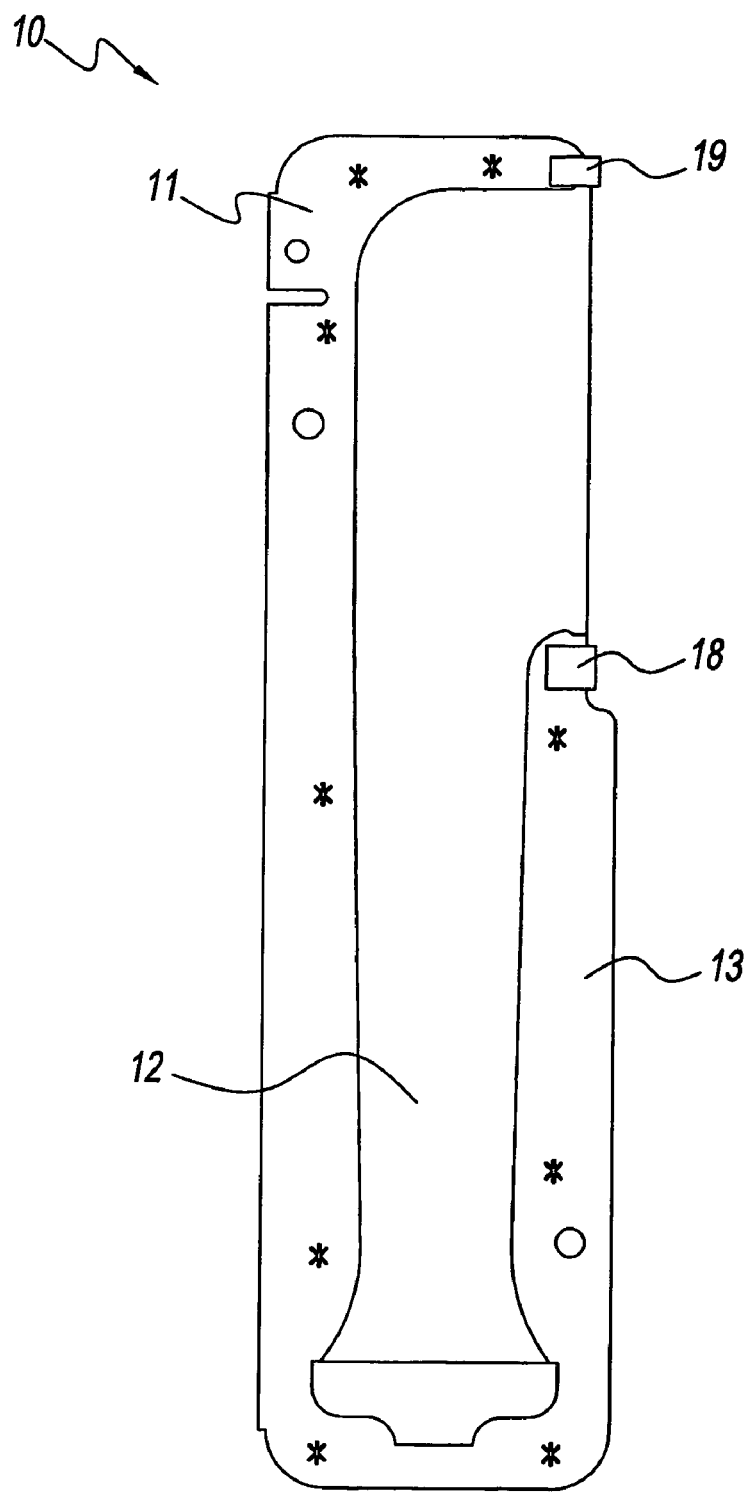
FIG. 3 shows a side view of a burner.
Figure 4:
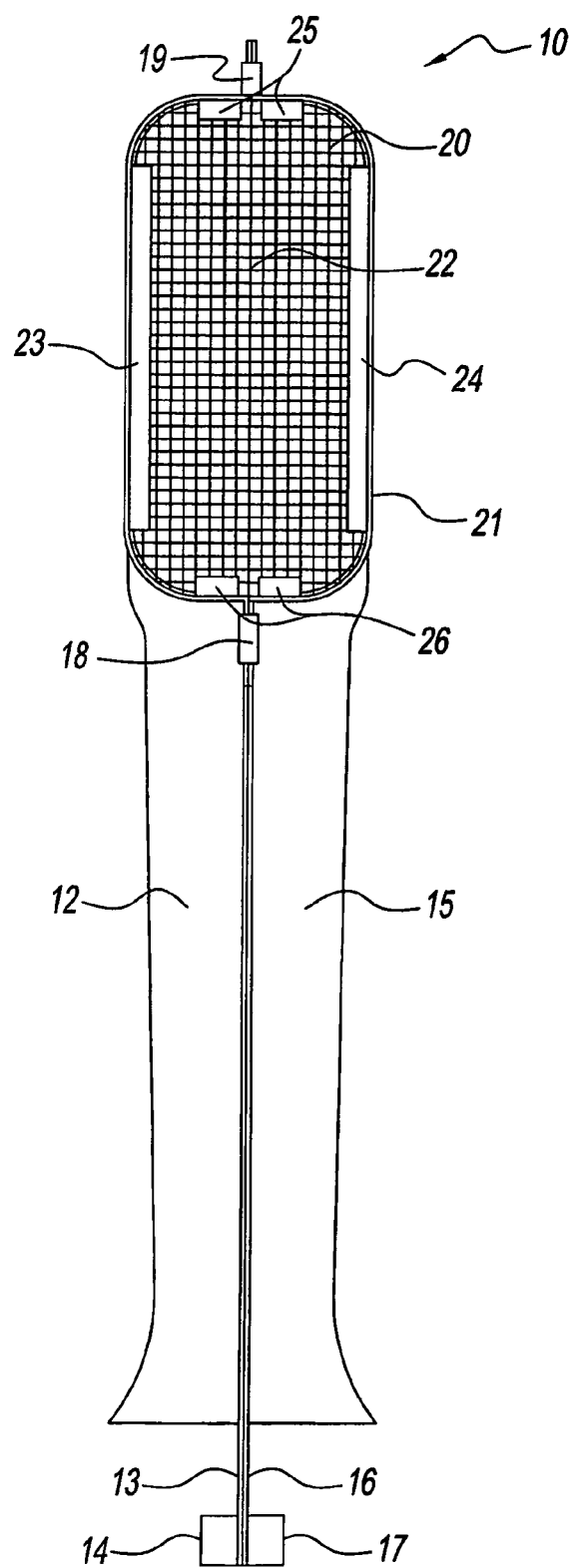
FIG. 4 shows a front view of the burner of FIG. 3.
Figure 5:
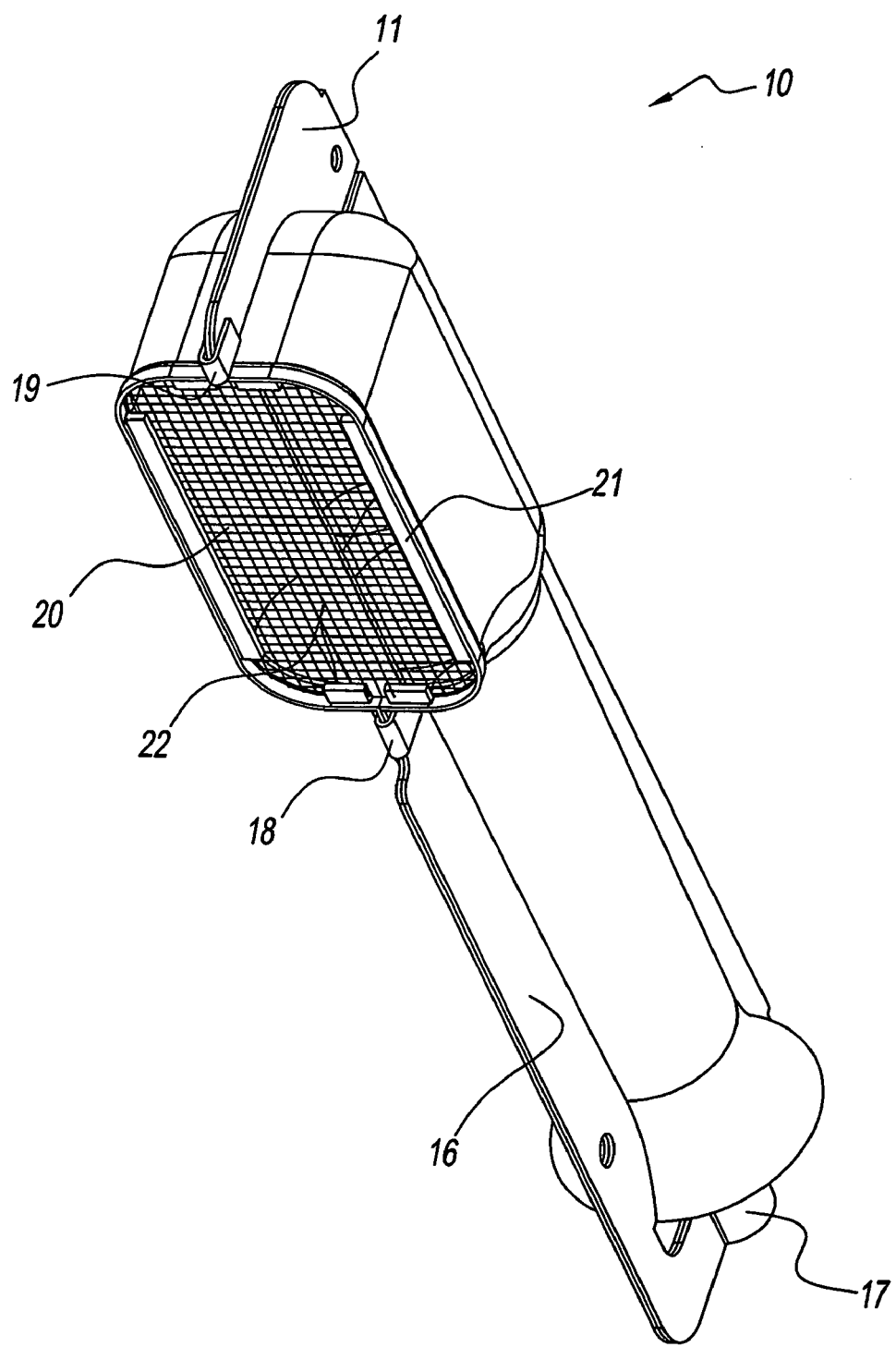
FIG. 5 shows a front, right-side perspective of the burner of FIG. 3.

Referring to FIGS. 3, 4, and 5, an enlarged view of burner 10 is shown. The body of burner 10 is formed from one continuous sheet of metal, which in the present embodiment is aluminized steel. The present invention, however, contemplates the use of other materials to form burner 10, such as galvanized or stainless steel. Burner 10 has right burner side 12 and left burner side 15.

Right and left burner sides 12 and 15 have right and left outer edges 13 and 16, respectively. Right and left burner sides 12 and 15 are joined together through the use of several spot welding points along right and left outer edges 13 and 16, as shown in FIG. 3. Although this is the preferred means of joining the burner sides together, other fastening means and methods are contemplated by the present invention. These methods include, but are not limited to, more permanent means and methods, such as with fasteners, by tabs that bend over the outer edges 13 and 16, or by embosses in the burner sides 12 and 15, so that no relative motion between burner sides 12 and 15 is possible.

Referring specifically to FIG. 4, right gas inlet ring 14 and left gas inlet ring 17 are formed along the bottom portion of right and left outer edges 13 and 16 respectively. Thus, when right and left burner sides 12 and 15 are connected the two inlet rings form a circle that receives gas input from gas manifold 30, discussed in further detail below.

Burner 10 also has mounting bracket tab 11. During assembly, mounting bracket tab 11 is bent to one side to accommodate mounting bracket 61, discussed in further detail below.

Burner 10 also has burner screen face 20 and burner screen frame 21. Burner screen frame 21 is formed from one continuous sheet of metal, and has center screen support 22 (seen more clearly in FIG. 5), right side securing tab 23, left side securing tab 24, a pair of upper securing tabs 25, a pair of lower securing tabs 26, and lower and upper support clips 18 and 19. Thus, burner screen frame 21 is placed on the opening in the body of burner 10 as shown, with burner screen face 20 placed over it. Right side securing tab 23, left side securing tab 24, upper securing tabs 25, and lower securing tabs 26 are then bent over burner screen face 20 to hold it in place. Burner screen face 20 can also be spot welded to center screen support 22 to provide additional support.

Burner screen 20 and burner screen frame 21 are designed to provide optimal mixing of the combustion products before ignition. The screen and frame design has also proven to be better for flame retention as opposed to traditional cast hole burners and perforated plate components commonly in use.

Lower and upper support clips 18 and 19 provide additional support to the burner by fitting around right and left burner sides 12 and 15 just above and below the burner face. Although in the shown embodiment the means of attachment is that of a simple pressure fit, other means of connecting lower and upper support clips 18 and 19 to the body of burner 10 are contemplated by the present invention, including more permanent attachment means such as welding.

Figure 6:
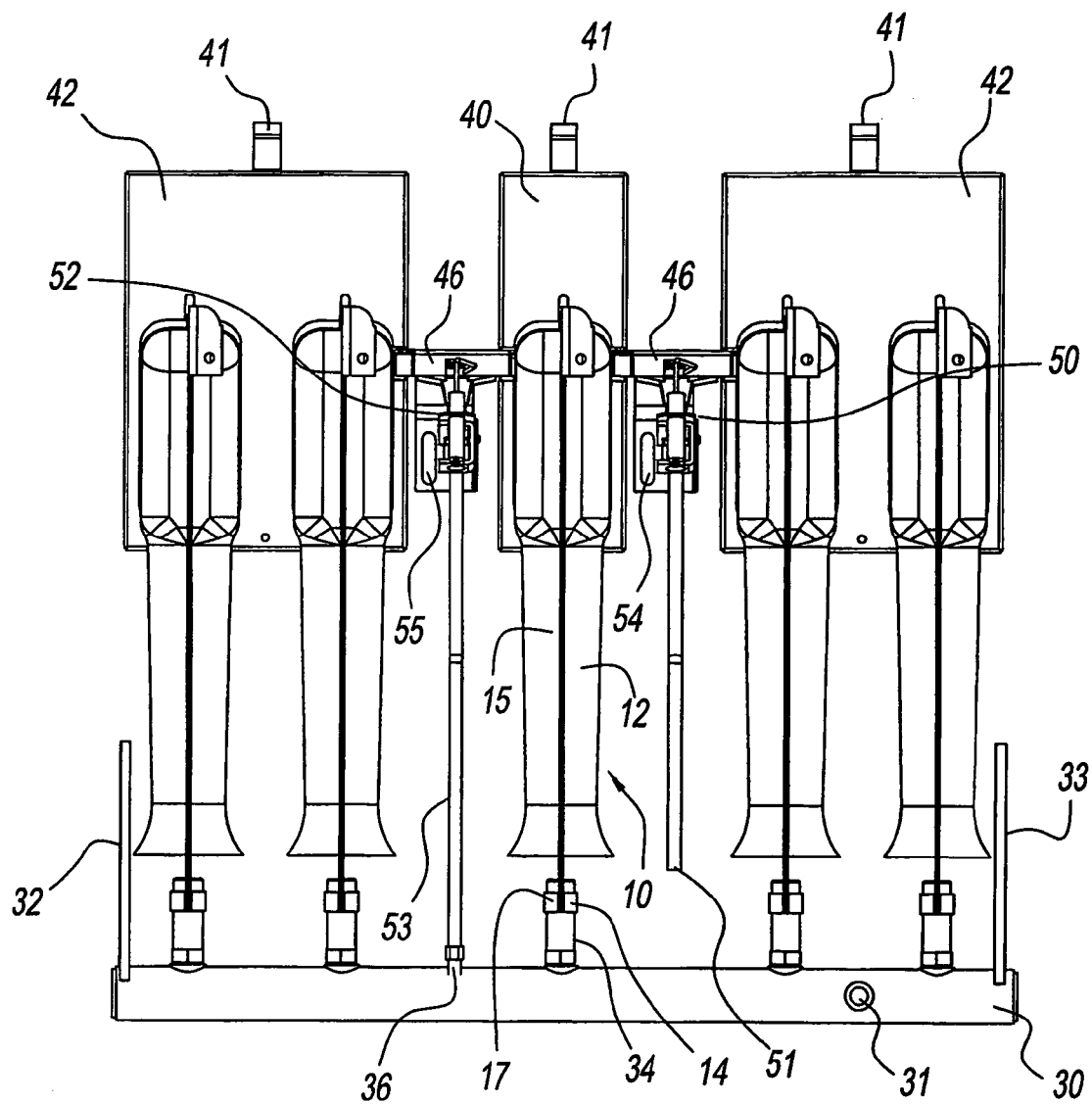
FIG. 6 shows a rear view of a five-burner assembly, including the burners, the mounting boxes, and the manifold.
Figure 7:
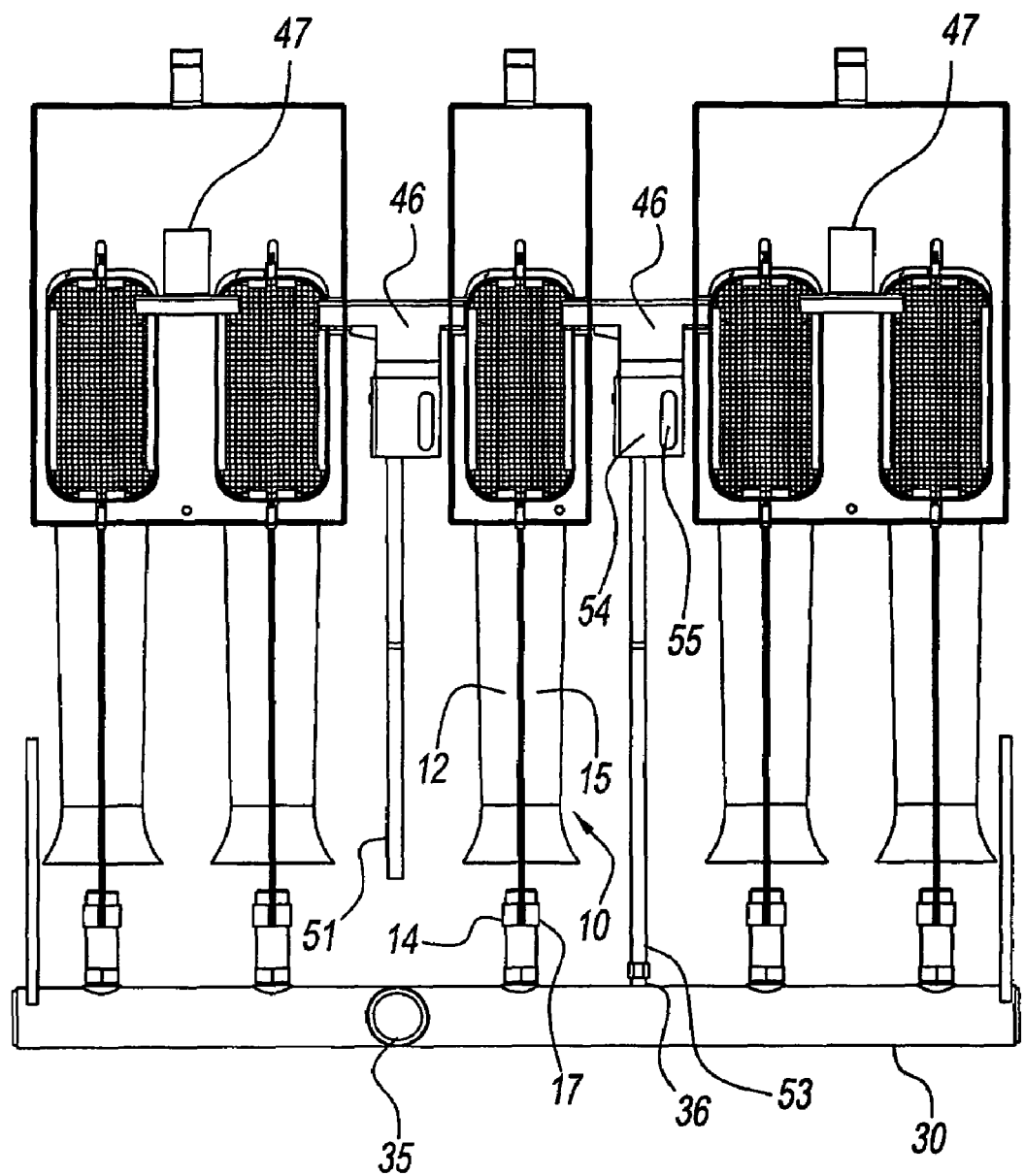
FIG. 7 shows a front view of the components shown in FIG. 6.
Figure 8:
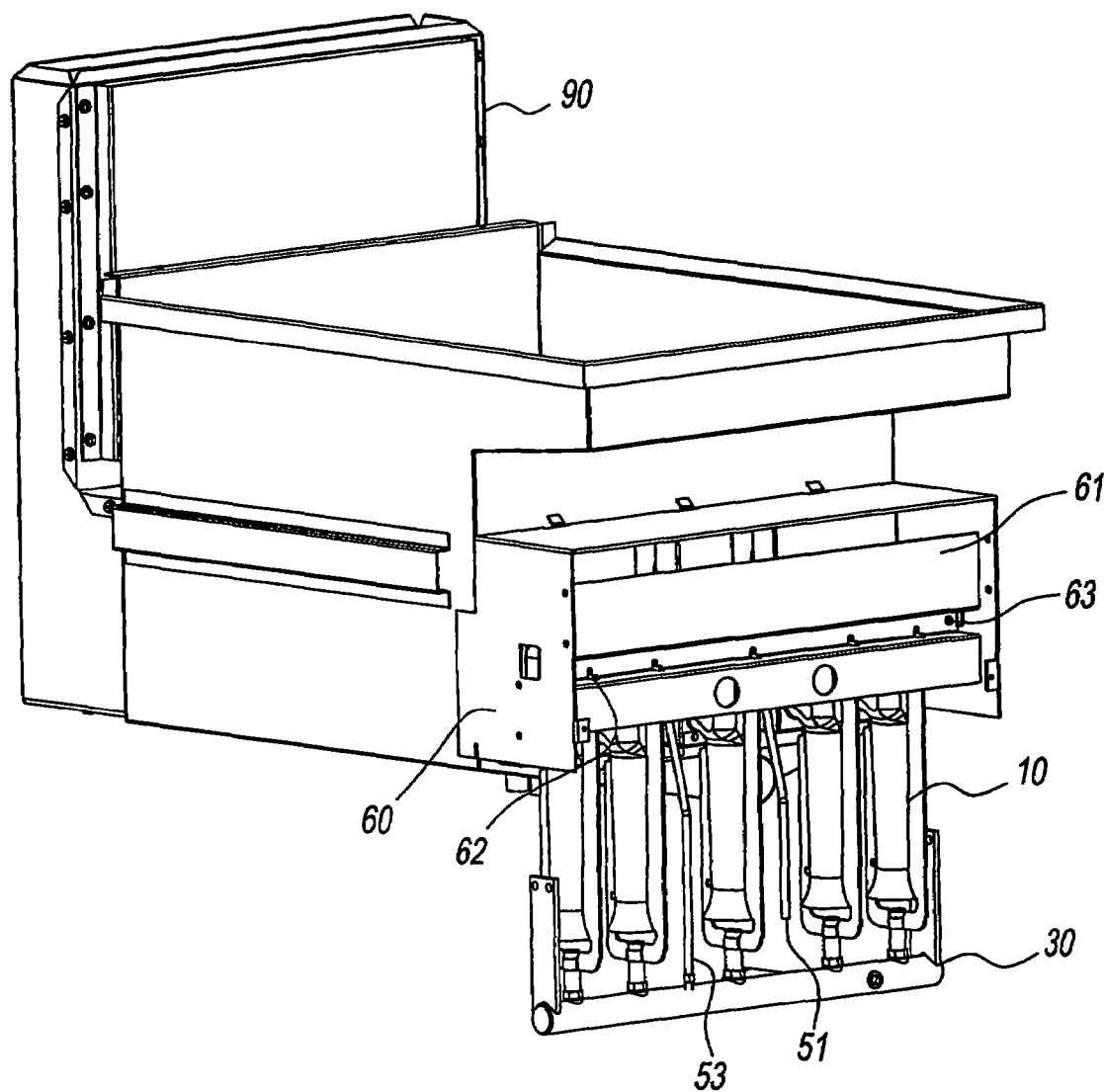
FIG. 8 shows the burner assembly of FIG. 6, further comprising a mounting bracket that connects the burners to a frypot.
Figure 9:
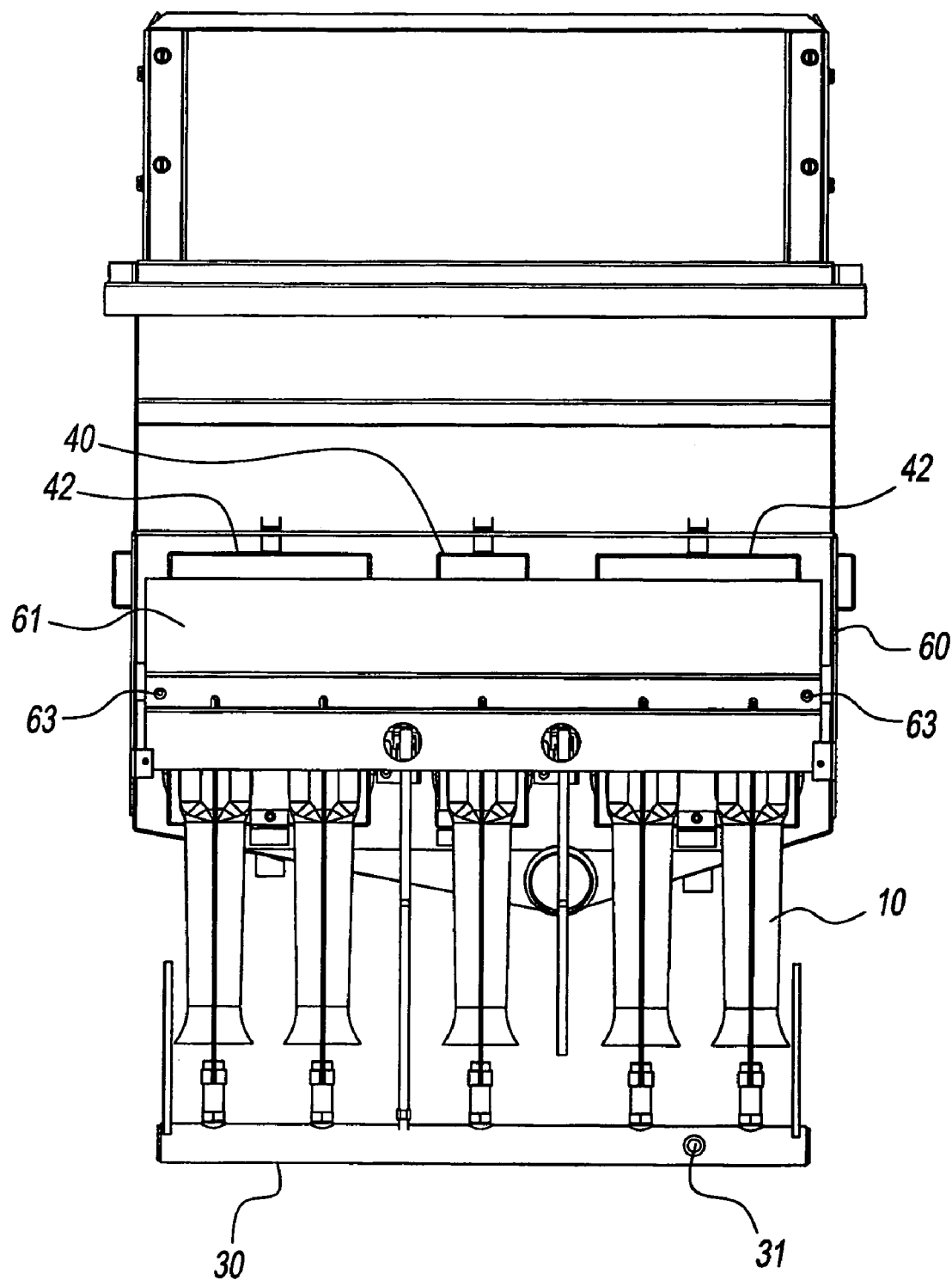
FIG. 9 shows a rear view of the assembly shown in FIG. 8.
Figure 10:
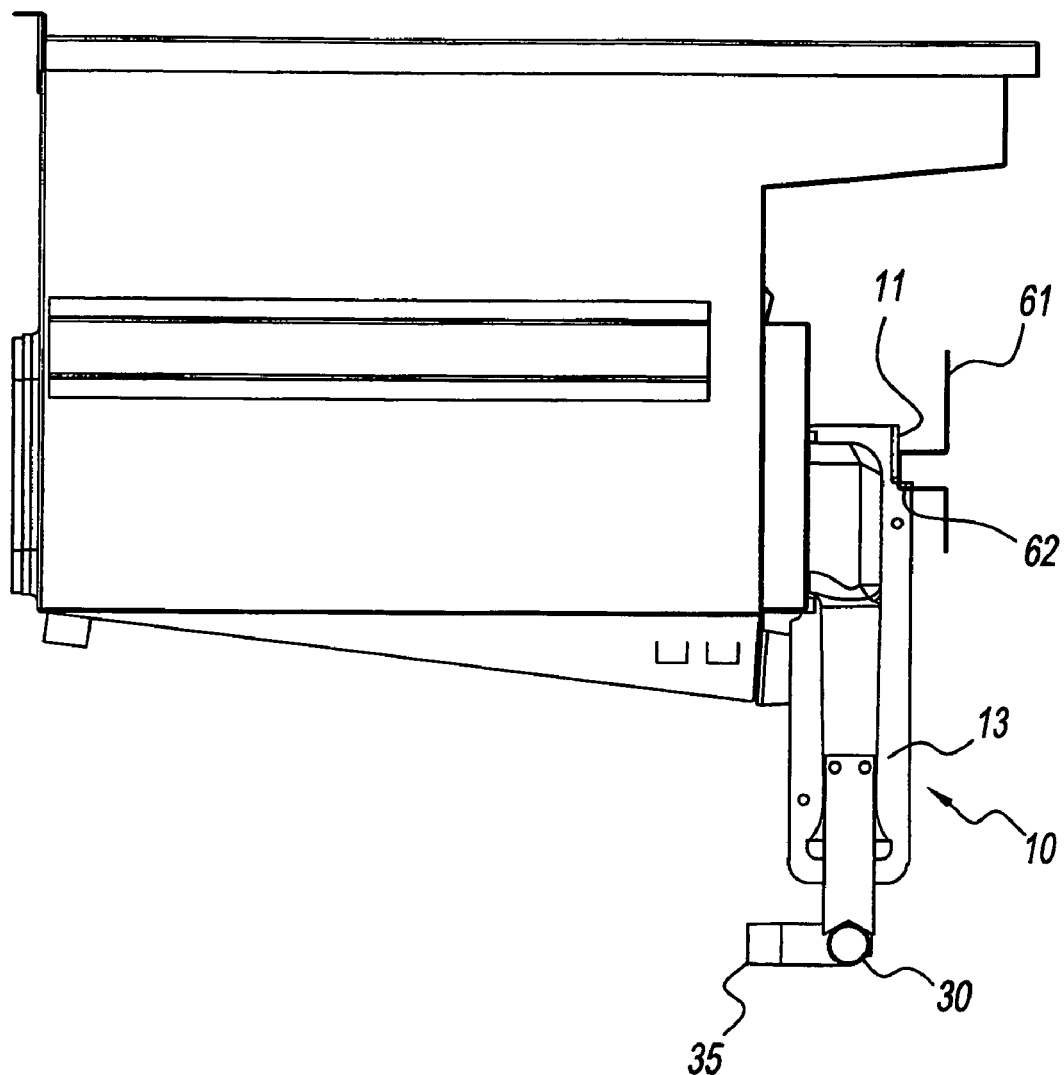
FIG. 10 shows a side view of the assembly shown in FIG. 8.

Referring to FIGS. 6 and 7, burners 10 are connected to gas manifold 30 as shown. Gas manifold 30 has right mounting bracket 32 and left mounting bracket 33, used to hold gas manifold 30 in place during operation of the shown burner assembly.

Gas manifold 30 also has one or more gas nozzles 34. In the shown embodiment, there are five such nozzles; however, the present invention contemplates the use of one or more nozzles, to correspond to the number of burners used. Gas nozzles 34 are aligned along the axis of gas manifold 30 so that they correspond to the opening at the bottom of burner 10 formed by right and left gas inlet rings 14 and 17. Gas nozzle 34 is then inserted into the opening. Thus, during operation, gas is supplied to gas manifold 30 through gas manifold inlet 35, and enters burner 10 after passing through gas nozzle 34. Gas nozzle 34 is connected to gas manifold 30 with a threaded connection; however, other more permanent means and methods of connecting gas nozzle 34 to gas manifold 30 are contemplated by the present invention.

In the present invention, burners 10 are substantially 90° in-shot burners, which draw in ambient air through the bottom of burner 10 as gas is injected by gas nozzles 34. This orientation of the burner encourages more thorough mixing of the gas fuel with the ambient air, to allow for more efficient burner operation. Thus, this orientation of the burners achieves a better mixing of gas fuel and air, and ultimately produces a combustion that is more controllable, consistent and efficient than in other burner orientations. In the shown embodiment, the burner face is at a 90° orientation to the opening through which gas enters the burner. This angle can be varied, however, from approximately 70° to approximately 110°.

The present invention also has a number of single burner mounting boxes 40, a number of double burner mounting boxes 42, or a combination thereof. In the shown embodiment, there are two double burner mounting boxes 42 and one single burner mounting box 40. Single burner mounting box 40 is designed to accommodate one burner 10, and double burner mounting box 42 is designed to accommodate two burners 10. In use, the burner mounting box is attached to the side of the frypot, as is shown in FIGS. 1 and 2. Top mounting tab 41 is used in a tab and slot mechanism that connects the mounting box to the frypot.

The present invention also has primary pilot assembly 50 and secondary pilot assembly 52, which have primary pilot stem 51 and secondary pilot stem 53, respectively. Primary pilot assembly 50 and secondary pilot assembly 52 can be standard assemblies that are fitted to the burners and mounting boxes. The pilot assemblies can be lit manually, or with the use of an electrical ignition system, which is shown in the diagrams.

Primary pilot stem 51 is connected directly to an external gas valve. Secondary pilot stem 53 is connected to pilot orifice 36 of gas manifold 30. In the shown embodiment, secondary pilot stem 53 is connected to pilot orifice 36 with a threaded connection; however, other more permanent means and methods of connecting secondary pilot stem 53 to pilot orifice 36 are contemplated by the present invention.

Both primary and secondary pilot assemblies 50 and 52 are connected to the frypot with the use of pilot assembly bracket 54. Pilot assembly bracket 54 has aperture 55. During assembly, a fastener can be inserted through aperture 55 to connect pilot assembly bracket 54 to the frypot.

Both primary pilot assembly 50 and secondary pilot assembly 52 split the gas flowing up pilot stems 51 and 53, respectively, into two directions. In one embodiment of the invention, gas exits from the top end of primary and secondary pilot assemblies 50 and 52, and is lit by the ignition mechanism. The resulting flame passes on to burners 10 through pilot carryover structures 46. Double burner mounting boxes 42 have mounting box carryover structures 47 to assist in the lighting of both burners within. Thus, mounting box carryover structure 47 ensures proper flame propagation between adjacent burners within double burner mounting box 42. This improves the overall ignition and reliability of the fryer by ensuring that both burners within double burner mounting box 42 are lit by the pilot. In a second embodiment of the invention, gas exits from the top end of primary pilot assembly 50, and is lit by the ignition mechanism. The resulting flame passes on to adjacent burners 10 through pilot carryover structure 46. Flame now present on the centermost burner 10 passes to the secondary pilot assembly 52 through the corresponding pilot carryover structure 46 to ignite the fuel gas emitting from secondary pilot stem 53. Flame then passes to the remaining burners 10 through the secondary pilot assembly 52 carryover structure 46.

In the shown embodiment, there are two pilot assemblies used. This is advantageous because it provides additional safety in the event that one of the pilots is extinguished during fryer operation. However, the present invention contemplates the use of one or more pilot assemblies.

Referring to FIGS. 8, 9, 10, and 11, when the fryer is in use the burners 10 are held in place by bracket housing 60 and burner mounting bracket 61. Bracket housing 60 is welded onto the frypot. Mounting bracket 61 has one or more bracket burner notches 62, corresponding to the number of burners 10 used. Thus (as is shown specifically in FIG. 10), when bracket housing 60 and mounting bracket 61 are placed over the burners 10, mounting bracket tab 11 of burner 10 is bent to the side. This creates a ridge out of right and left outer edges 13 and 16 for mounting bracket 61 to rest on, through burner mounting notches 62. Mounting bracket 61 is then fastened to bracket housing 60 with the use of two bracket fasteners 63 on either side of mounting bracket 61. Thus, bracket housing 60 and mounting bracket 61 hold burners 10 in place while the frypot is in use, and only require two fasteners to complete the assembly.

Figure 11:
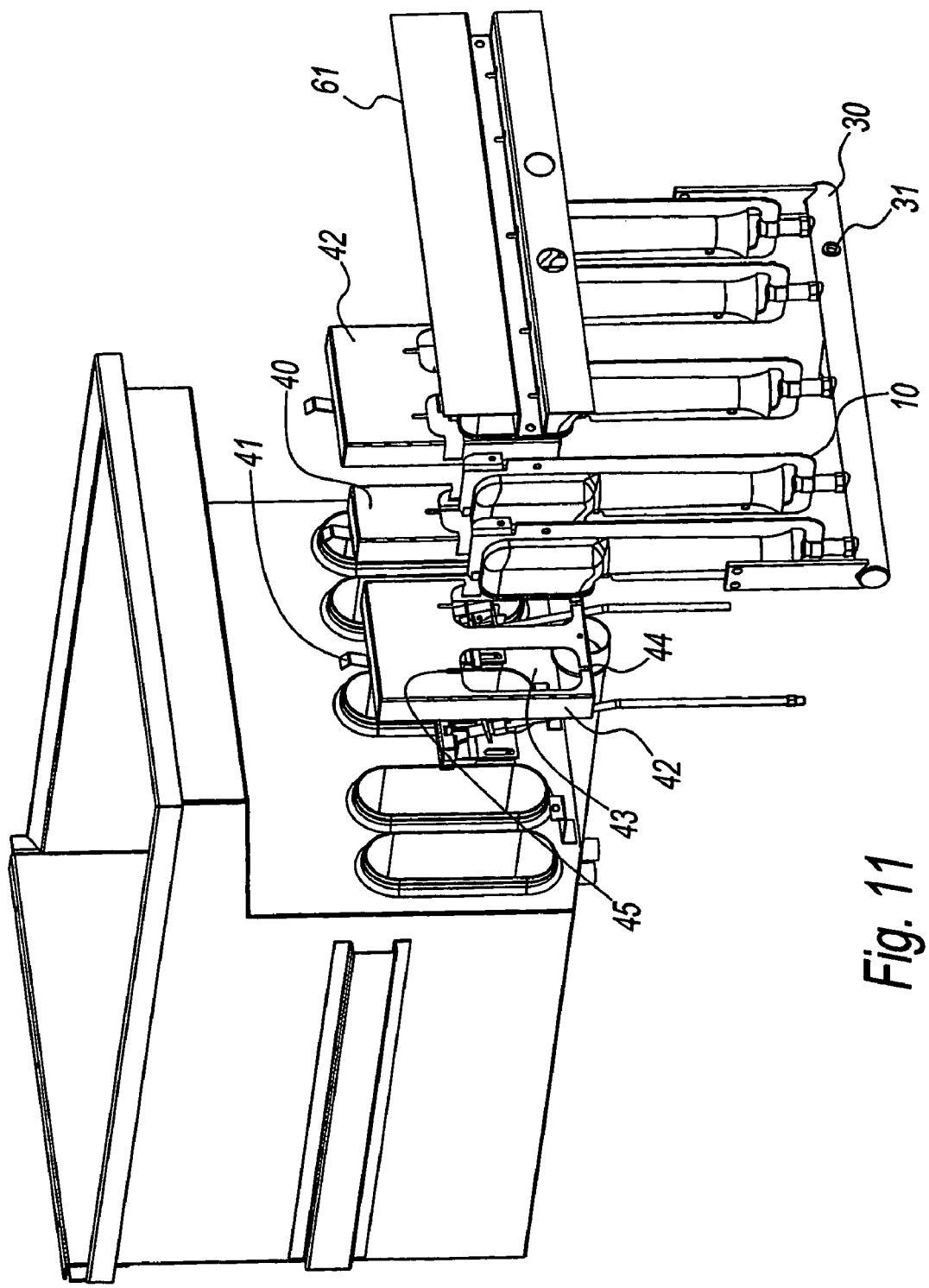
FIG. 11 shows an exploded view of the assembly shown in FIG. 8.

Referring specifically to FIG. 11, the keyed system that holds burners 10 steady is shown. Single mounting box 40 and double mounting box 42 each have at least one burner interface opening 43. During operation, the face of burner 10 is placed in burner interface opening 43. Burner interface opening 43 also has lower mounting notch 44 and upper mounting notch 45. These notches correspond to lower and upper support clip 18 and 19 of burner 10, respectively. Thus, when the face of burner 10 is inserted into burner interface opening 43, lower and upper support clips 18 and 19 are inserted into lower and upper burner notches 44 and 45 respectively, holding burner 10 in place. Mounting bracket 61 is then connected to bracket housing 60 as described above, preventing any significant movement by burners 10.

There are several advantages to the design of the single and double burner mounting boxes described above. First, the mounting notches on the burner mounting box face allow for a quick and easy removal and re-installation of the burners. Traditionally, burners in tube fryers are mounted to the frypot with the use of one or more fasteners per burner. These fasteners often take a substantial amount of time to remove. In the present invention, the burners are easily serviced by removing the two fasteners 63 from mounting bracket 61 and removing the bracket. These are the only two fasteners that need to be removed in order to service the burners 10. Burner 10 is then removed from the mounting box by sliding it out of lower and upper mounting notch 44 and 45.

Another advantage to the mounting box design is that it substantially prevents surplus ambient air, in addition to what is already inside the burner body, from being suctioned into the heat exchanger tube. When too much ambient air (which has not been properly mixed with the combustion gas inside the body of burner 10) enters the heat exchanger tube, the efficiency of the fryer is decreased because the hot combustion gasses are diluted with relatively cool air. The burner mounting boxes 40 and 42 are attached to the side of the frypot as described above, preventing any introduction of ambient air at that point in the assembly. The face of burner 10 is inserted into mounting box burner opening 43, lower mounting notch 44, and upper mounting notch 45 (as described above) so that there is very little space between the face of burner 10 and burner opening 43. Therefore, very little ambient air enters the heat exchanger tube during operation.

Figure 12:
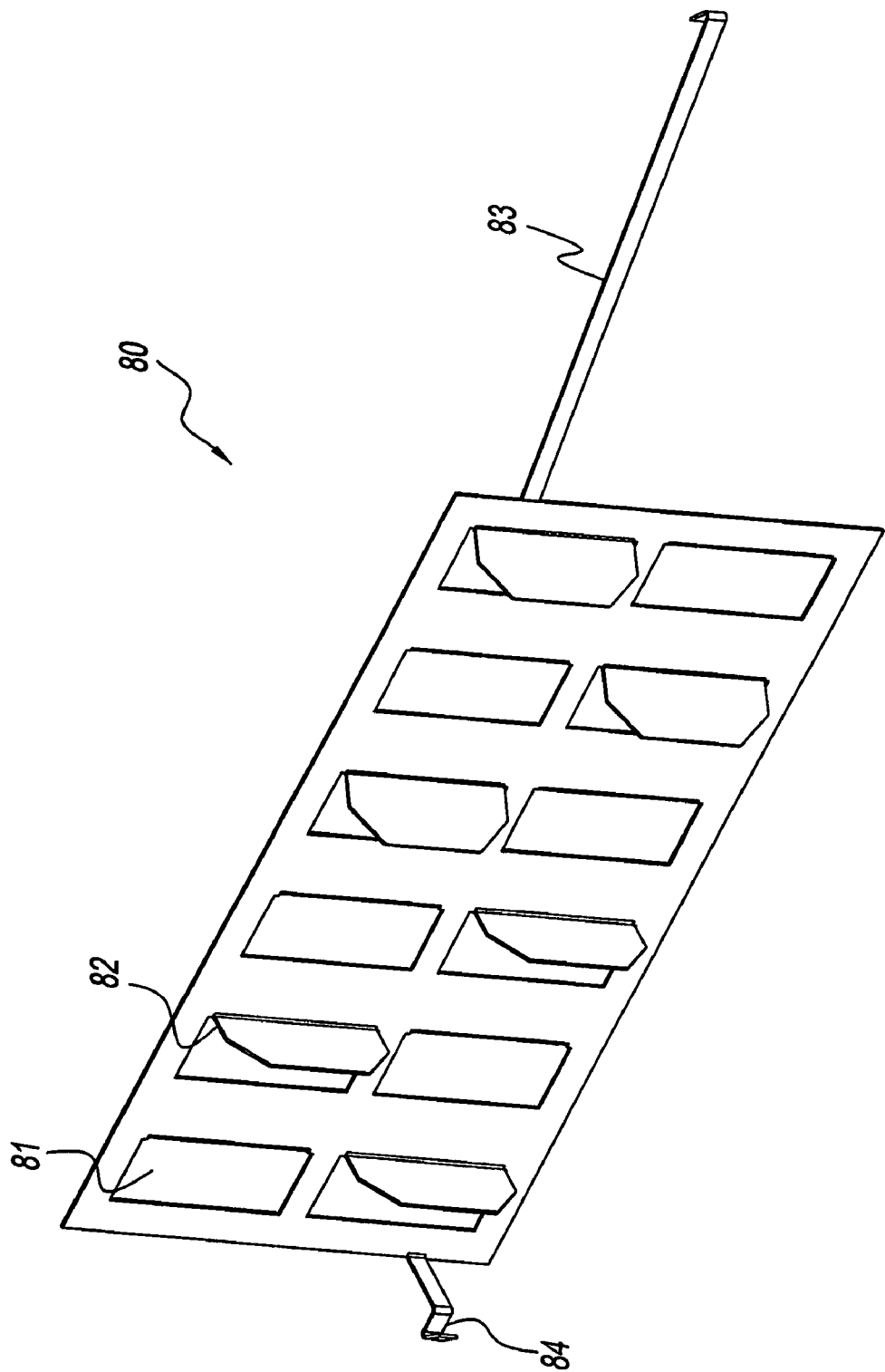
FIG. 12 shows a rear, left-side perspective view of the baffles that are placed inside the heat exchanger tubes of fryer.
Figure 13:
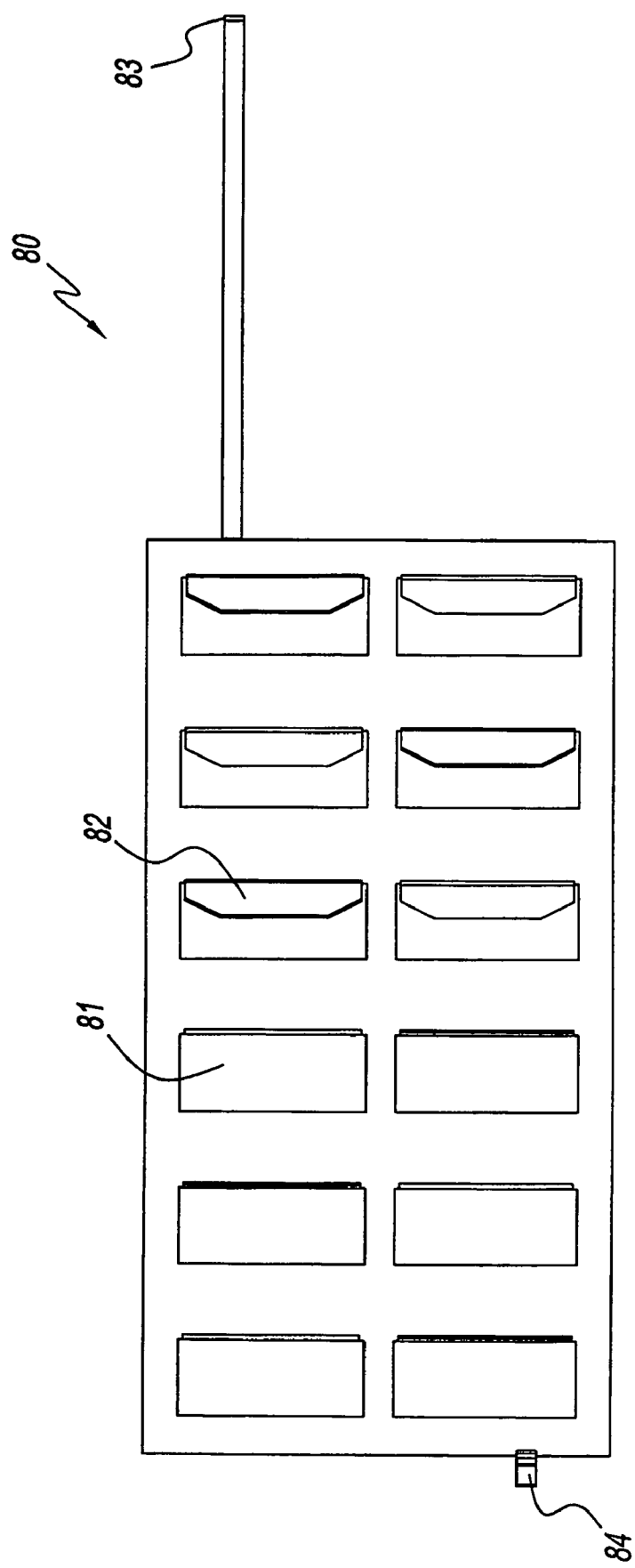
FIG. 13 shows a side view of the baffles shown in FIG. 12.

Referring to FIGS. 12 and 13, heat transfer baffle 80 is shown. Heat transfer baffle 80 has one or more baffle openings 81 and baffle fins 82. In the present embodiment, heat transfer baffle 80 has twelve baffle openings 81 and twelve baffle fins 82; however, other baffle opening and fin configurations are contemplated by the present invention. Baffle fins 82 can be bent at a variety of angles and configurations to ensure optimal mixing of the combustion gasses. In the shown embodiment, the front six baffles are bent at a sixty-degree angle, three to the left and three to the right. The rear six baffles are bent at ninety-degree angles, three to the left and three to the right.

Heat transfer baffle 80 also improves the heat transfer efficiency of the fryer by acting as a source of heat transfer itself. Heat transfer baffle 80 is heated by the combustion gasses during fryer operation and subsequently conducts and radiates heat to the heat exchanger tube.

Heat transfer baffle 80 also has rear locating tab 83 and front locating tab 84. During assembly, front and rear locating tabs 84 and 83 are connected to heat exchanger tube 70 to hold heat transfer baffle 80 in place.

To initialize the deep fat tube fryer of the present disclosure, the operator turns on the fryer heat controls (not shown). If the temperature of the cooking oil medium in frypot 95 is below a required oil set point temperature, the control circuit energizes the primary and secondary pilot assemblies 50 and 52. Once a sensor in the pilot assemblies measures a pilot flame, the main valve of gas inlet 35 opens and gas then flows from gas inlet 35 into gas manifold 30. Gas rises up from gas manifold 30, through gas nozzle 34, into the body of burner 10. Gas rising up through the body of burner 10 mixes with atmospheric air and exits ninety degrees out through the burner face. At the burner face, the pilot flame ignites the gas/air fuel mixture. Flame and combustion gasses travel through the heat exchanger tubes 70, transferring heat to the tubes, heat transfer baffles 80 and subsequently to the cooking oil that surrounds heat exchanger tubes 70 in frypot 95. Combustion by-products continue to move through heat exchanger tubes 70 and exhaust out through flue 90. Once the control circuit measures frypot oil temperature within a designed tolerance to the set point temperature, the control circuit shuts off the main valve of gas inlet 35, until the frypot oil temperature drops below the required set point and the burner cycle begins again.

While several embodiments and features of the present disclosure are discussed above, it is to be clearly understood that the same are susceptible to numerous changes apparent to one skilled in the art. The fryer of the present disclosure, therefore, should not be limited to specific embodiments shown and described, but should also include all changes and modifications which come within the scope of the appended claims.

What is claimed is:

1. A fryer assembly, comprising:

a frypot;

at least one heat exchanger tube, wherein said heat exchanger tube is disposed within said frypot;

at least one burner comprising a top opening and a bottom opening;

at least one burner mounting box, a keyed burner mounting bracket, and a gas manifold, wherein said keyed burner mounting bracket and said burner mounting box align said burner to said heat exchanger tube, to prevent the passage of a significant amount of ambient air therethrough, and so that there is no substantial movement of said burner, wherein when the fryer assembly is in use, a mixture of gas and air exits said gas manifold, enters said bottom opening of said burner, travels in an upward direction, and exits at said top opening of said burner.

2. The fryer assembly of claim 1, further comprising at least one heat exchanger tube baffle, disposed within said heat exchanger tube.

3. The fryer assembly of claim 1, further comprising a bracket housing, wherein said bracket housing is connected to said frypot, and said keyed mounting bracket is connected to said bracket housing with two fasteners.

4. The fryer assembly of claim 1, wherein a screen and frame is connected to said top opening of said burner, and wherein said frame comprises a screen support and a plurality of securing tabs for connecting said screen to said frame.

5. The fryer assembly of claim 4, further comprising:
a pilot assembly, said pilot assembly being operably connected to a source of gas, and
a pilot carryover structure connected to said burner mounting box, wherein
gas flows from said gas manifold into said pilot assembly, and is ignited therein to form a pilot flame, and
wherein said pilot carryover structure propagates said pilot flame to said screen of said burner, and ignites said air and gas mixture exiting therefrom.

6. The fryer assembly of claim 5, further comprising a burner carryover structure disposed within said burner mounting box, so that said burner carryover structure propagates flame between two or more of said burners.

7. The fryer assembly of claim 1, wherein said burner further comprises a body, wherein said body comprises one continuous sheet of metal.

8. The fryer assembly of claim 7, further comprising a screen and frame assembly connected to said top opening of said burner, wherein said frame comprises a screen support and a plurality of securing tabs for connecting said screen to said frame.

9. A method for heating oil in a frypot of a fryer assembly, wherein said fryer assembly comprises:
said frypot;
at least one heat exchanger tube, wherein said heat exchanger tube is disposed within said frypot;
at least one burner;
at least one burner mounting box, and
a keyed burner mounting bracket, wherein said keyed burner mounting bracket and said burner mounting box align said burner to said heat exchanger tube, to prevent the passage of a significant amount of ambient air therethrough, and so that there is no substantial movement of said burner;
a gas manifold operably connected to said burner, wherein said burner comprises a top opening and a bottom opening, so that when the fryer assembly is in use, a mixture of gas and air exits said gas manifold and enters said bottom opening of said burner, travels in an upward direction, and exits at said top opening of said burner,
a pilot assembly, said pilot assembly being operably connected to a source of gas, and
a pilot carryover structure connected to said burner mounting box,
the method comprising the steps of:
determining a set point of operation for said oil;
supplying gas to said pilot assembly;
measuring the temperature of said oil, and if said temperature is less than said set point, supplying gas to said gas manifold, energizing said pilot assembly, and forming a pilot flame, so that said pilot carryover structure propagates said pilot flame to said screen of said burner, and ignites said air and gas mixture exiting therefrom, and
if said temperature is greater than or equal to said set point, shutting off the supply of said gas to said gas manifold.

* * * * *